(12) United States Patent
Honkomp

(10) Patent No.: US 7,189,063 B2
(45) Date of Patent: Mar. 13, 2007

(54) METHODS AND APPARATUS FOR COOLING GAS TURBINE ENGINE ROTOR ASSEMBLIES

(75) Inventor: Mark Steven Honkomp, Taylors, SC (US)

(73) Assignee: General Electric Company, Schenectady, NY (US)

( * ) Notice: Subject to any disclaimer, the term of this patent is extended or adjusted under 35 U.S.C. 154(b) by 93 days.

(21) Appl. No.: 10/932,492

(22) Filed: Sep. 2, 2004

(65) Prior Publication Data

US 2006/0045741 A1    Mar. 2, 2006

(51) Int. Cl.
F01D 5/14 (2006.01)
F01D 5/30 (2006.01)

(52) U.S. Cl. .................................. 416/193 A
(58) Field of Classification Search ................. 415/115; 416/96 A, 96 R, 97 R, 193 A
See application file for complete search history.

(56) References Cited

U.S. PATENT DOCUMENTS

| 2,603,453 | A | * | 7/1952 | Sollinger | 416/97 R |
| 2,915,279 | A | * | 12/1959 | Chamberlin | 416/97 R |
| 4,726,735 | A | * | 2/1988 | Field et al. | 416/97 R |
| 5,020,970 | A | * | 6/1991 | Dussourd et al. | 415/115 |
| 5,281,097 | A | * | 1/1994 | Wilson et al. | 416/193 A |
| 6,273,683 | B1 | | 8/2001 | Zagar et al. | |
| 6,428,270 | B1 | * | 8/2002 | Leone et al. | 415/115 |
| 6,431,833 | B2 | * | 8/2002 | Jones | 416/97 R |
| 6,478,540 | B2 | | 11/2002 | Abuaf et al. | |
| 2005/0095128 | A1 | * | 5/2005 | Benjamin et al. | 416/97 R |

* cited by examiner

Primary Examiner—Edward K. Look
Assistant Examiner—Nathan Wiehe
(74) Attorney, Agent, or Firm—Armstrong Teasdale LLP

(57) ABSTRACT

A method for assembling a rotor assembly for gas turbine engine is provided. The method includes providing a first rotor blade that includes an airfoil, a platform, a shank, and a dovetail. The airfoil extends radially outward from the platform, the shank extends radially inward from the platform, and the dovetail extends from the shank, forming a recess within a portion of the shank. The method also includes coupling the first rotor blade to a rotor shaft using the dovetail, and coupling a second rotor blade to the rotor shaft such that a shank cavity is defined between the first and second rotor blade shanks. During operation, cooling air may enter and pressurize the shank cavity through the recessed portion.

17 Claims, 4 Drawing Sheets

METHODS AND APPARATUS FOR COOLING GAS TURBINE ENGINE ROTOR ASSEMBLIES

BACKGROUND OF THE INVENTION

This application relates generally to gas turbine engines and, more particularly, to methods and apparatus for cooling gas turbine engine rotor assemblies.

At least some known rotor assemblies include at least one row of circumferentially-spaced rotor blades. Each rotor blade includes an airfoil that includes a pressure side, and a suction side connected together at leading and trailing edges. Each airfoil extends radially outward from a rotor blade platform to a tip, and also includes a dovetail that extends radially inward from a shank extending between the platform and the dovetail. The dovetail is used to couple the rotor blade within the rotor assembly to a rotor disk or spool. At least some known blades are hollow such that an internal cooling cavity is defined at least partially by the airfoil, platform, shank, and dovetail.

During operation, because the airfoil portions of the blades are exposed to higher temperatures than the dovetail portions, temperature gradients may develop at the interface between the airfoil and the platform, and/or between the shank and the platform. Over time, thermal strain caused by such temperature gradients may induce compressive thermal stresses to the blade platform. Moreover, over time, the increased operating temperature of the platform may cause platform oxidation, platform cracking, and/or platform creep deflection, which may shorten the useful life of the rotor blade.

To facilitate reducing the effects of the high temperatures in the platform region, at least some known rows of rotor blades are coupled to a rotor disk such that a predetermined gap is defined between adjacent blade platforms. The gap enables leakage of cooling air to circulate near the platform region. However, within known rotor blades, such gaps may provide only limited cooling to the rotor blade platforms.

BRIEF SUMMARY OF THE INVENTION

In one embodiment, a method for assembling a rotor assembly for gas turbine engine is provided. The method includes providing a first rotor blade that includes an airfoil, a platform, a shank, and a dovetail, wherein the airfoil extends radially outward from the platform, the shank extends radially inward from the platform, and the dovetail extends from the shank, forming a recess within a portion of the shank, coupling the first rotor blade to a rotor shaft using the dovetail, and coupling a second rotor blade to the rotor shaft such that a shank cavity is defined between the first and second rotor blade shanks, such that, during operation, cooling air may enter and pressurize the shank cavity through the recessed portion.

In another embodiment, a rotor blade for a gas turbine engine is provided. The rotor blade includes a platform, an airfoil extending radially outward from the platform, a shank extending radially inward from the platform, and a dovetail extending radially inward from the shank, wherein at least a portion of the shank is recessed to facilitate increasing pressure of cooling air supplied to a shank cavity defined adjacent said shank during engine operation.

In a further embodiment, a gas turbine engine rotor assembly is provided. The rotor assembly includes a rotor shaft, and a plurality of circumferentially-spaced rotor blades coupled to the rotor shaft wherein each rotor blade includes an airfoil extending radially outward from a platform, a shank extending radially inward from the platform, and a dovetail extending from the shank for coupling the rotor blade to the rotor shaft, each shank includes a pair of opposing sidewalls that extend axially between an upstream sidewall and a downstream sidewall, the plurality of rotor blades are circumferentially-spaced such that a shank cavity is defined between each pair of adjacent rotor blades, at least a portion of the rotor blade shank upstream sidewall is recessed such that the shank cavity may be pressurized during engine operation.

DETAILED DESCRIPTION OF THE INVENTION

Figure 1:
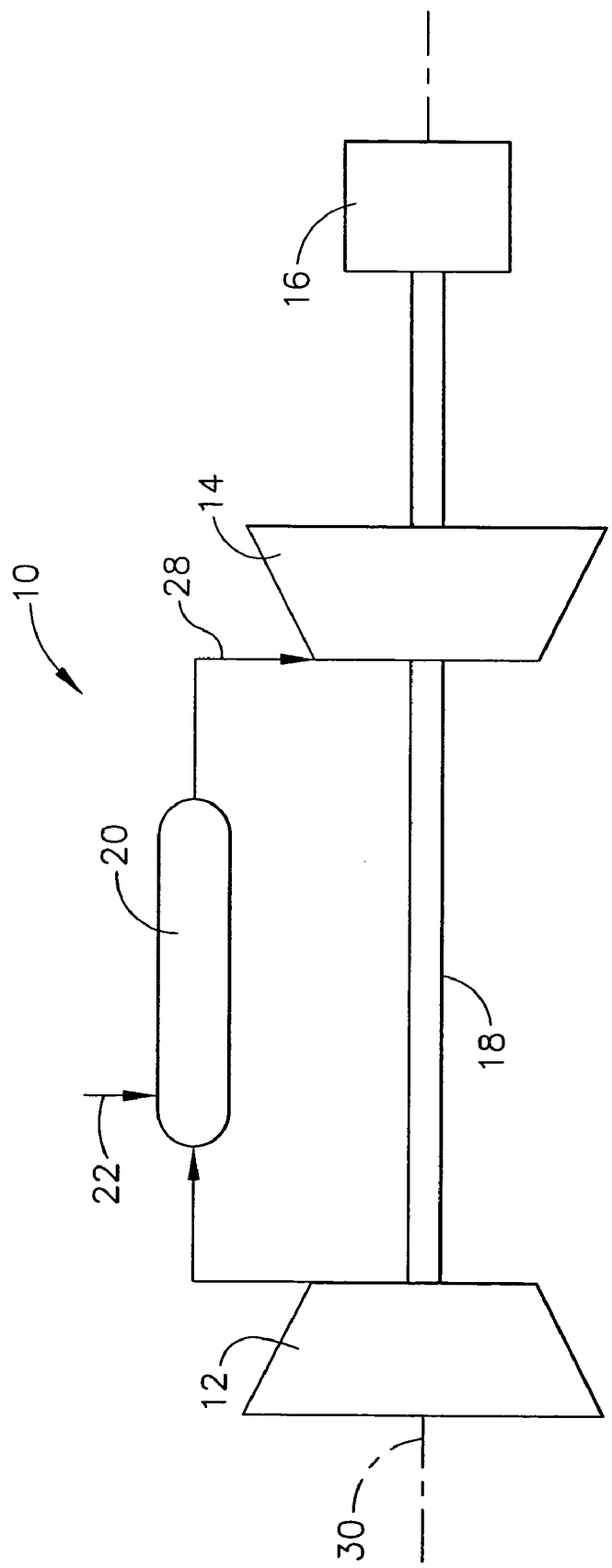
FIG. 1 is schematic illustration of a gas turbine engine.

FIG. 1 is a schematic illustration of an exemplary gas turbine engine 10 coupled to an electric generator 16. In the exemplary embodiment, gas turbine system 10 includes a compressor 12, a turbine 14, and generator 16 arranged in a single monolithic rotor or shaft 18. In an alternative embodiment, shaft 18 is segmented into a plurality of shaft segments, wherein each shaft segment is coupled to an adjacent shaft segment to form shaft 18. Compressor 12 supplies compressed air to a combustor 20 wherein the air is mixed with fuel 22 supplied thereto. In one embodiment, engine 10 is a 7FA+e gas turbine engine commercially available from General Electric Company, Greenville, S.C.

In operation, air flows through compressor 12 and compressed air is supplied to combustor 20. Combustion gases 28 from combustor 20 propels turbines 14. Turbine 14 rotates shaft 18, compressor 12, and electric generator 16 about a longitudinal axis 30.

Figure 2:
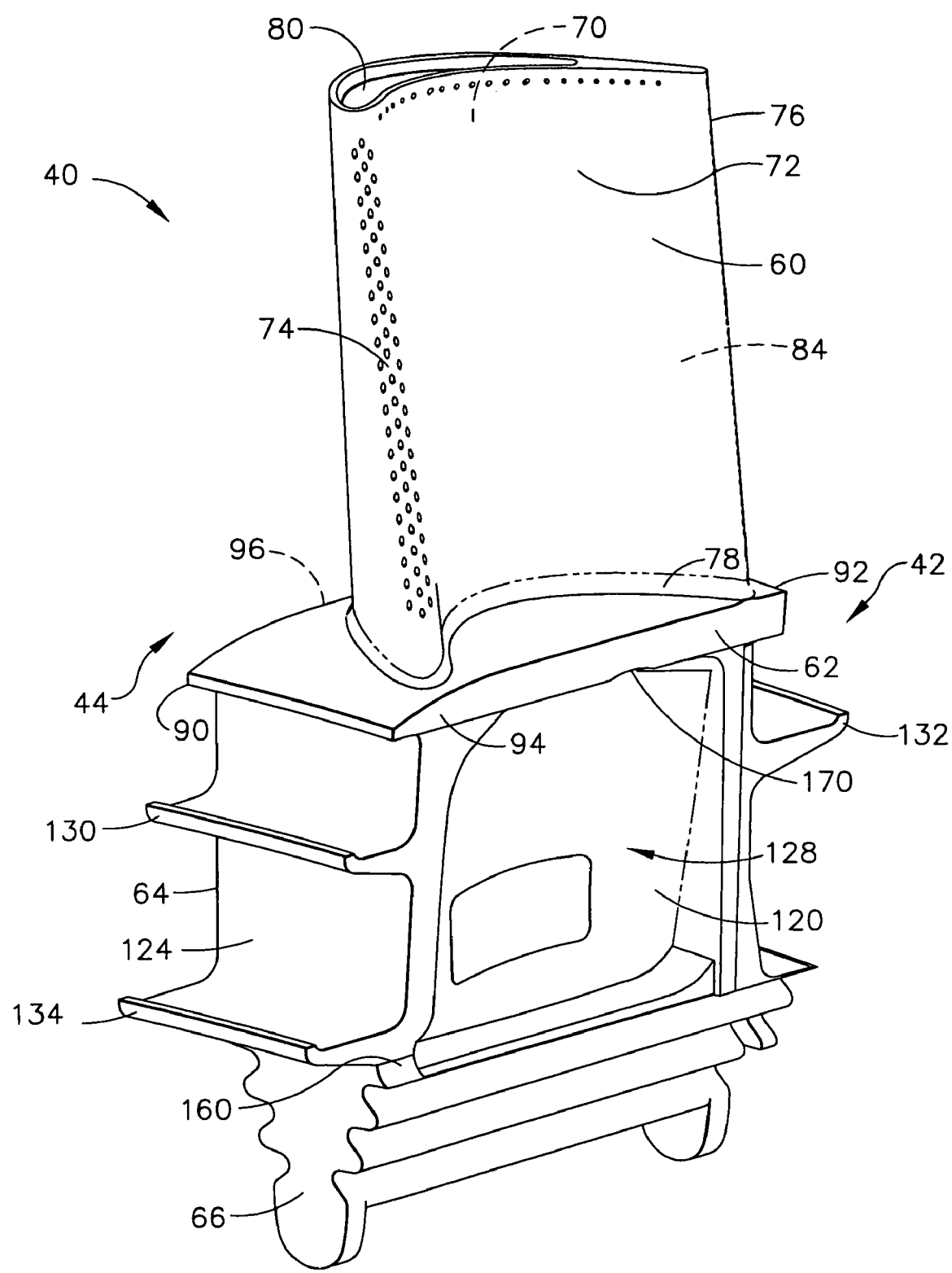
FIG. 2 is an enlarged perspective view of a rotor blade that may be used with the gas turbine engine shown in FIG. 1.
Figure 3:
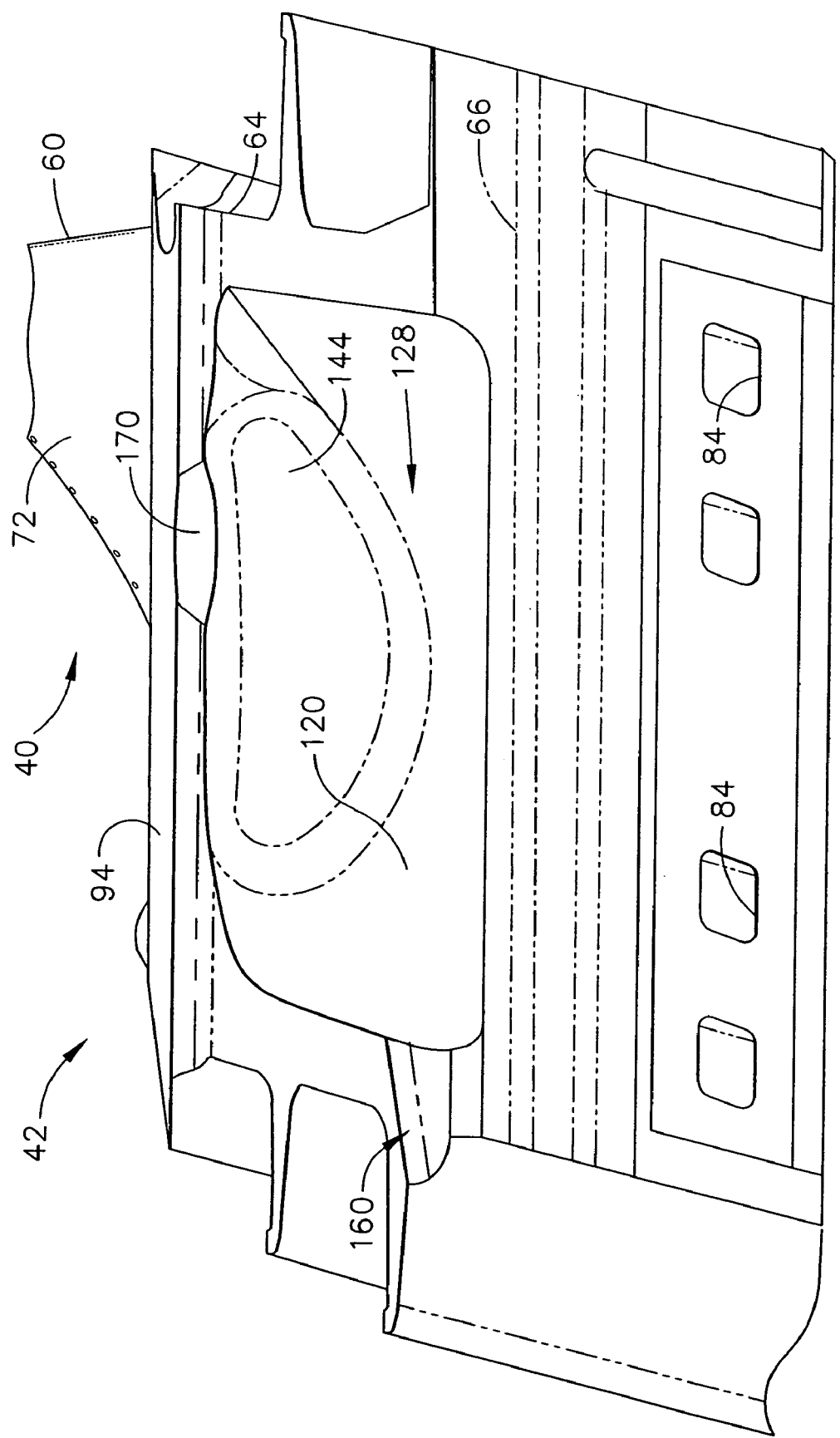
FIG. 3 is an enlarged perspective view of the rotor blade shown in FIG. 2 and viewed from the underside of the rotor blade.
Figure 4:
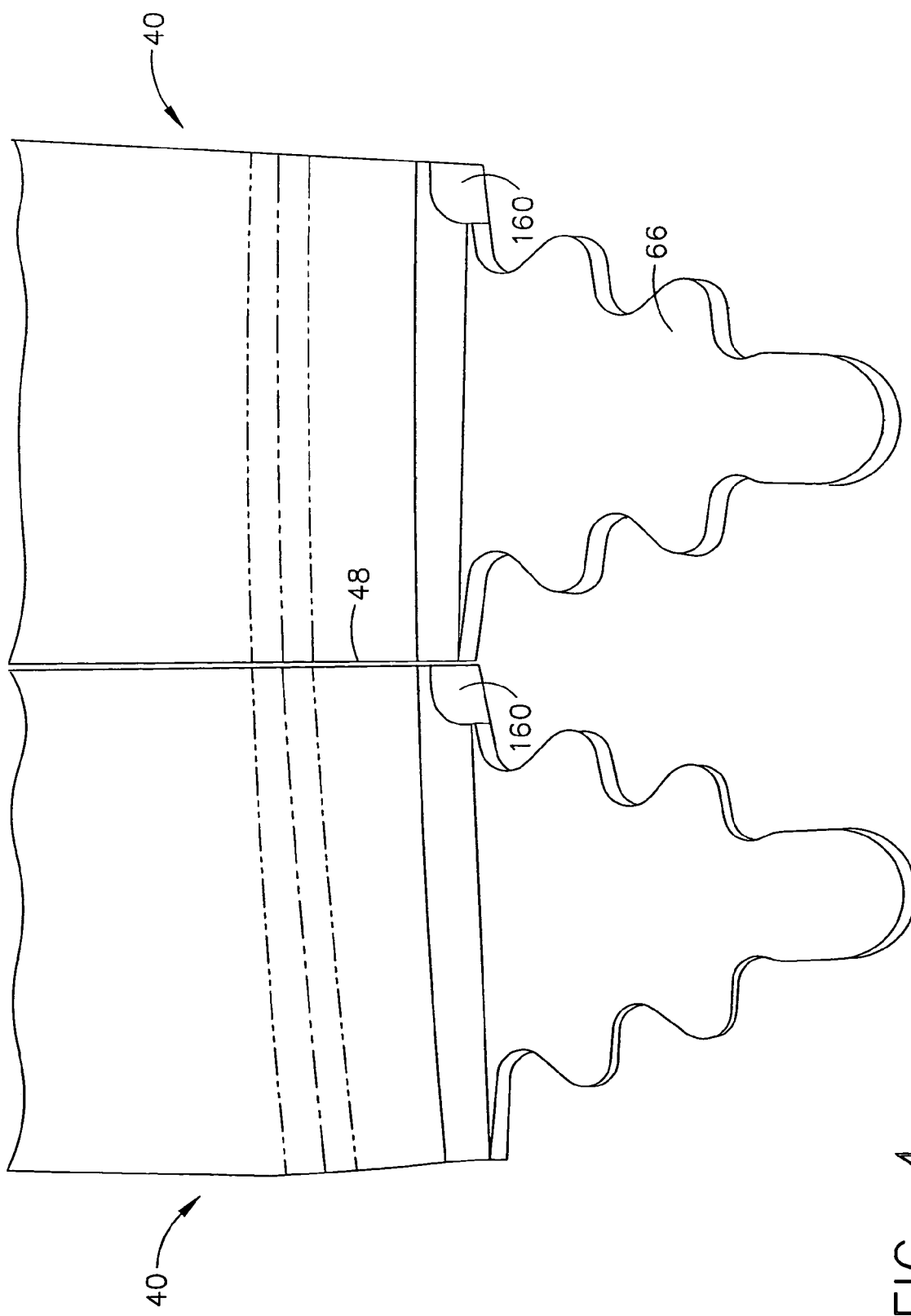
FIG. 4 is a front view illustrating a relative orientation of the circumferential spacing between the rotor blade shown in FIG. 2 and other rotor blades when coupled within the gas turbine engine shown in FIG. 1.

FIG. 2 is an enlarged perspective view of a rotor blade 40 that may be used with gas turbine engine 10 (shown in FIG. 1) viewed from a first side 42 of rotor blade 40. FIG. 3 is an enlarged perspective view of rotor blade 40 and viewed from an underside of rotor blade 10. FIG. 4 is a front view and illustrates a relative orientation of circumferential spacing defined between circumferentially adjacent rotor blades 40, when blades 40 are coupled within a rotor assembly, such as turbine 14 (shown in FIG. 1). In the exemplary embodiment, blade 40 has been modified to include the features described herein. More specifically, when rotor blades 40 are coupled within the rotor assembly, a predetermined platform gap 48 is defined between the circumferentially adjacent rotor blades 40.

When coupled within the rotor assembly, each rotor blade 40 is coupled to a rotor disk (not shown) that is rotatably coupled to a rotor shaft, such as shaft 18 (shown in FIG. 1). In an alternative embodiment, blades 40 are mounted within a rotor spool (not shown). In the exemplary embodiment, circumferentially adjacent blades 40 are identical and each extends radially outward from the rotor disk and includes an airfoil 60, a platform 62, a shank 64, and a dovetail 66. In the exemplary embodiment, airfoil 60, platform 62, shank 64, and dovetail 66 are collectively known as a bucket.

Each airfoil 60 includes first sidewall 70 and a second sidewall 72. First sidewall 70 is convex and defines a suction side of airfoil 60, and second sidewall 72 is concave and defines a pressure side of airfoil 60. Sidewalls 70 and 72 are joined together at a leading edge 74 and at an axially-spaced trailing edge 76 of airfoil 60. More specifically, airfoil trailing edge 76 is spaced chord-wise and downstream from airfoil leading edge 74.

First and second sidewalls 70 and 72, respectively, extend longitudinally or radially outward in span from a blade root 78 positioned adjacent platform 62, to an airfoil tip 80. Airfoil tip 80 defines a radially outer boundary of an internal cooling chamber 84 is defined within blades 40. More specifically, internal cooling chamber 84 is bounded within airfoil 60 between sidewalls 70 and 72, and extends through platform 62 and through shank 64 and into dovetail 66.

Platform 62 extends between airfoil 60 and shank 64 such that each airfoil 60 extends radially outward from each respective platform 62. Shank 64 extends radially inwardly from platform 62 to dovetail 66, and dovetail 66 extends radially inwardly from shank 64 to facilitate securing rotor blades 40 and 44 to the rotor disk. Platform 62 also includes an upstream side or skirt 90 and a downstream side or skirt 92 that are connected together with a pressure-side edge 94 and an opposite suction-side edge 96. When rotor blades 40 are coupled within the rotor assembly, platform gap 48 is defined between adjacent rotor blade platforms 62, and accordingly is known as a platform gap.

Shank 64 includes a substantially concave sidewall 120 and a substantially convex sidewall (not shown) connected together at an upstream sidewall 124 and a downstream sidewall 126 of shank 64. Accordingly, shank sidewall 120 is recessed with respect to upstream and downstream sidewalls 124 and 126, respectively, such that when blades 40 are coupled within the rotor assembly, a shank cavity 128 is defined between adjacent rotor blade shanks 64.

In the exemplary embodiment, a forward angel wing 130 and an aft angel wing 132 each extend outwardly from respective shank sides 124 and 126 to facilitate sealing forward and aft angel wing buffer cavities (not shown) defined within the rotor assembly. In addition, a forward lower angel wing 134 also extends outwardly from shank side 124 to facilitate sealing between blades 40 and the rotor disk. More specifically, forward lower angel wing 134 extends outwardly from shank 64 between dovetail 66 and forward angel wing 130.

To facilitate increasing a pressure within shank cavity 128, in the exemplary embodiment, shank sidewall 124 may be modified to include a recessed or scalloped portion 160 formed radially inward from forward lower angel wing 134. Recessed portion 160 is sized and oriented to permit a predetermined amount of cooling airflow into shank cavity. In the exemplary embodiment, recessed portion 160 is substantially parallel to longitudinal axis 30. Accordingly, when adjacent rotor blades 40 are coupled within the rotor assembly, recessed portion 160 enables additional cooling air flow into shank cavity 128 to facilitate increasing an operating pressure within shank cavity 128. As such, recessed portion 160 facilitates maintaining a sufficient back flow margin for platform cooling using platform gap 48.

Generally, during engine operation, bucket pressure side 42 generally operates at higher temperatures than rotor blade suction side 44. Cooling air entering shank cavity 128 through shank sidewall recessed portion 160 facilitates maintaining a sufficient back flow margin within shank cavity 128 such that at least a portion of the cooling air within shank 128 may be channeled through platform undercut purge slot 170 and through platform gap 48. As the cooling air is forced outward through slot 170 and platform gap 48, platform 62 is convectively cooled to facilitate reducing the operating temperature of platform 62 such that thermal strains induced to platform 62 are also reduced.

The above-described rotor blades provide a cost-effective and reliable method for supplying cooling air to facilitate reducing an operating temperature of the rotor blade platform. More specifically, through cooling flow, thermal stresses induced within the platform, and the operating temperature of the platform is facilitated to be reduced. Accordingly, platform oxidation, platform cracking, and platform creep deflection is also facilitated to be reduced. As a result, the rotor blade cooling circuit facilitates extending a useful life of the rotor assembly and improving the operating efficiency of the gas turbine engine in a cost-effective and reliable manner.

Exemplary embodiments of rotor blades and rotor assemblies are described above in detail. The rotor blades are not limited to the specific embodiments described herein, but rather, components of each rotor blade may be utilized independently and separately from other components described herein. For example, each rotor blade cooling circuit component can also be used in combination with other rotor blades, and is not limited to practice with only rotor blade 40 as described herein. Rather, the present invention can be implemented and utilized in connection with many other blade and cooling circuit configurations.

While the invention has been described in terms of various specific embodiments, those skilled in the art will recognize that the invention can be practiced with modification within the spirit and scope of the claims.

What is claimed is:

1. A method for assembling a rotor assembly for gas turbine engine, said method comprising:
    providing a first rotor blade that includes an airfoil, a platform, a shank, and a dovetail, wherein the airfoil extends radially outward from the platform, the shank extends radially inward from the platform, and the dovetail extends from the shank;
    forming a recess within a portion of the shank;
    coupling the first rotor blade to a rotor shaft using the dovetail;
    coupling a second rotor blade to the rotor shaft such that a shank cavity is defined between the first and second rotor blade shanks, such that, during operation, cooling air may enter and pressurize the shank cavity through the recessed portion; and
    coupling the first rotor blade to the shaft such that during operation cooling air may be channeled from the shank cavity through a purge slot undercut within at least a portion of a platform radially inner surface.

2. A method in accordance with claim 1 wherein coupling a second rotor blade to the rotor shaft comprises coupling the second rotor blade to the shaft such that a predetermined platform gap is defined between the first and second rotor blade platforms.

3. A method in accordance with claim 1 wherein coupling the first rotor blade to a rotor shaft further comprises coupling the first rotor blade to the shaft such that during operation the shank cavity is pressurized by airflow entering the cavity through a recessed portion that is formed radially inward from an angel wing extending outward from an upstream side of the rotor blade shank.

4. A method in accordance with claim 3 wherein coupling the first rotor blade to a rotor shaft further comprises coupling the first rotor blade to the shaft such that during operation the shank cavity may be pressurized by airflow entering the cavity through a recessed portion that is formed between the angel wing and the dovetail.

5. A method in accordance with claim 3 wherein coupling the first rotor blade to a rotor shaft further comprises coupling the first rotor blade to the shaft such that during operation the shank cavity may be pressurized by airflow entering the cavity through a recessed portion defined in the pressure side of the shank.

6. A method of modifying a rotor blade for a gas turbine engine wherein the blade includes an airfoil, a platform, a shank, and a dovetail, the airfoil extending radially outward from the platform, the shank extending radially inward from the platform, and the dovetail extending from the shank, said method comprising:
   forming a recess in at least an upstream portion of a sidewall defining the shank; and
   forming a purge slot undercut within at least a portion of a platform radially inner surface.

7. A method in accordance with claim 6 wherein forming a recess in at least a portion of the upstream portion of the sidewall comprises sizing the recess such that a predetermined back flow margin is maintained within the shank cavity during engine operation.

8. A method in accordance with claim 6 wherein forming a recess in at least a portion of the upstream portion of the sidewall comprises forming the recess such that the recess is oriented substantially parallel to a longitudinal axis of the rotor shaft when the blade is installed on the rotor.

9. A method in accordance with claim 6 further comprising forming a purge slot within at least a portion of the platform wherein the purge slot is sized to channel a predetermined cooling air flow therethrough to facilitate cooling the platform.

10. A rotor blade for a gas turbine engine, said rotor blade comprising:
    a platform;
    an airfoil extending radially outward from said platform;
    a shank extending radially inward from said platform;
    a dovetail extending from said shank, wherein at least a portion of said shank is recessed to facilitate increasing pressure of cooling air supplied to a shank cavity defined adjacent said shank during engine operation; and
    a purge slot undercut within at least a portion of a platform radially inner surface such that during operation cooling air may be channeled from said shank cavity through said purge slot.

11. A rotor blade in accordance with claim 10 wherein said platform further comprises a purge slot formed within at least a portion of said platform radially inner surface, said purge slot configured to channel cooling air therethrough during engine operation.

12. A rotor blade in accordance with claim 10 wherein said shank further comprises at least one angel wing extending outward from said shank forward sidewall, said recessed portion formed radially inward from said at least one angel wing.

13. A rotor blade in accordance with claim 10 wherein said shank further comprises at least one angel wing extending outward from said shank forward sidewall, said recessed portion formed between said at least one angel wing and said dovetail.

14. A gas turbine engine rotor assembly comprising:
    a rotor shaft; and
    a plurality of circumferentially-spaced rotor blades coupled to said rotor shaft, each said rotor blade comprising an airfoil extending radially outward from a platform, a shank extending radially inward from said platform, and a dovetail, extending from said shank for coupling said rotor blade to said rotor shaft, each said shank comprising a pair of opposing sidewalls that extend axially between an upstream sidewall and a downstream sidewall, said plurality of rotor blades circumferentially-spaced such that a shank cavity is defined between each pair of adjacent said rotor blades, at least a portion of said rotor blade shank upstream sidewall is recessed such that said shank cavity may be pressurized during engine operation, said first rotor blade further comprises a purge slot undercut formed within at least a portion of a radially inner surface of said platform.

15. A gas turbine engine rotor assembly in accordance with claim 14 wherein each said rotor blade shank further comprises at least one angel wing extending radially outward from said shank upstream sidewall, at least a portion of said shank upstream sidewall radially inward from said rotor blade at least one angel wing is recessed such that said shank cavity may be pressurized during engine operation.

16. A gas turbine engine rotor assembly in accordance with claim 14 wherein each said rotor blade shank further comprises at least one angel wing extending radially outward from said shank upstream sidewall, at least a portion of said shank upstream sidewall between said at least one angel wing and said dovetail is recessed such that said shank cavity may be pressurized during engine operation.

17. A gas turbine engine rotor assembly in accordance with claim 14 wherein each said rotor blade shank further comprises at least one angel wing extending radially outward from said shank upstream sidewall, a recessed portion in the blade pressure side upstream sidewall between said at least one angel wing and said dovetail is recessed such that said shank cavity may be pressurized during engine operation.

* * * * *